May 2, 1939.  C. E. RECORDS  2,157,085
WATER WELL
Filed June 8, 1938
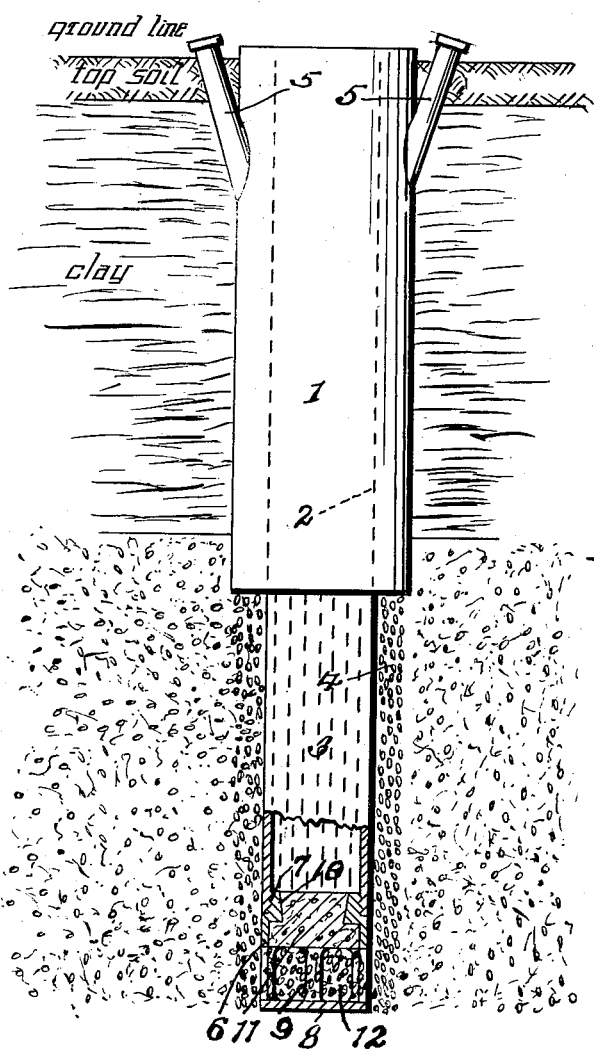
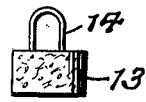
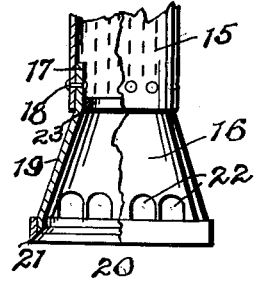
Inventor
Chester E. Records
By [signature]
Attorney Patented May 2, 1939

2,157,085

UNITED STATES PATENT OFFICE 2,157,085

WATER WELL

Chester E. Records, Columbus, Ohio

Application June 8, 1938, Serial No. 212,551

6 Claims. (Cl. 166—1)

This invention is directed to an improvement in water wells of the pebbled wall type including the type wherein the pebbled wall is artificially provided by introducing pebbles from the upper end of the well and between the screen and water-bearing sands or wherein the pebbled wall is developed by pumping from the well as initially formed and drawing into contact with the screen the fine sands and pebbles making up the water-bearing area, the development being continued until the pebbles of the natural deposit forms more or less of a wall surrounding the screen. The pebbled wall, either of the artificial or developed type, is utilized as a medium for filtering or screening the incoming water to preclude the passage therethrough of materials, such as fine sand and the like, so as to prevent such passing through the screen and into the water delivered from the well by the pump.

In pebbled wells, the pebbles serve to more or less hold back the sand and other water-carried impurities from the screen in order to permit the water entering the screen to be as clear as possible. Following more or less continued use of such wells, experience has demonstrated that fine particles of mud and the like may gradually find their way through the interstices of the pebbles and accumulate on the exterior of the screen. This material not only tends to a corrosion of the screen proper but gradually accumulates on the exterior of the screen to eventually interfere seriously with the passage of water through the screen openings, thereby gradually reducing the capacity of the well. Furthermore, it has been found that the interstices between the pebbles, which for most effective results should remain fully open, gradually accumulate a volume of sand and the like which reduces in no inconsiderable degree the volume of water passing through the pebbed layer in either the artificially developed pebbled wall or the naturally developed pebbled wall.

Of course, these objectionable accumulations on the screen and deposits in the interstices of the pebble layer are difficult if not impossible to eliminate though attempts have been made by backwashing to clear these obstructions. The obstructions, of course, do not noticeably affect the flow of water until some time after the well is installed and in operation. They constitute a serious menace to full water delivery and if permitted to continue, would eventually cut off practically all water supply from the well, necessitating either the abandonment of the well or the withdrawal of the screen in parts, the bailing out of the pebbles and the rebuilding of the well.

The primary object of the present invention is to provide a means whereby the more or less loose pebbles making up the pebble layer, either in the artificial wall type or naturally developed wall type, is compelled to move downwardly in the well through an appreciable distance with the effect to cause the pebbles in contact with or next to the screen to scrape off or scour the more or less fixed portion of the screen to restore the latter substantially to its original water passing condition; while at the same time and incident to this movement the pebbles or like particles making up the layer are moved up relatively to cause in such relative movement a breaking down and dislodgment of the sand and other particles which had previously closed or partly closed some of the interstices between the pebbles.

An essential characteristic of the invention is the physical removal from the bottom of the well and at or below the lower end of the screen of an appropriate amount of pebbles, as by bailing or the like. The space thus provided is more or less immediately filled by the gravital movement of the pebble layer which, of course, compels a downward movement of this pebble layer throughout its full height or depth. During this gravital movement of the pebbles, the pebbles next to and in contact with the screen are caused to exert a scouring or rubbing contact with the outer surface of the screen to thereby remove or substantially remove or break the incrustations or accumulations on the screen and thus substantially clear or more completely free the screen openings which were previously more or less closed by such accumulations. Furthermore, in the gravital movement of the pebble layer, there is, of course, more or less relative movement between the pebbles making up that layer with the result of dislodging or breaking away the particles of sand or the like which have accumulated in many of the interstices of the original pebble layer. The dislodged sand or other particles will gravitate to the bottom of the well and when the pebbles of the pebble layer reach their final and new position, the interstices are practically clear, with the natural effect of affording the passage of a greater amount of water in the same time period.

The invention in its preferred form is illustrated in the accompanying drawing, in which:

Figure 1 is an elevation, partly in section, of a water well showing the parts arranged in accordance with the present invention.

Figure 2 is an elevation of an auxiliary plug to be used in connection with the development of the invention.

Figure 3 is a broken view in elevation, partly in section, showing a slightly modified form of plug-carrying shoe for use at the bottom of the screen.

In the conventional pebbled well shown in Figure 1, the outer well casing 1 is fitted within the well bore surrounding the inner casing 2 to which is connected the screen 3 which may be of any conventional form or construction. In the particular type of well shown in Figure 1, the preferable operation is to sink the outer well casing 1 all the way down to the bottom of the well, positioning the screen and inner well casing 2, applying the pebbles from the top of the well to the appropriate height of the screen between the screen and outer well casing, and then withdrawing the outer well screen to a position approximately level with the top of the screen. The pebbled wall, indicated at 4, is thus interposed between the screen and the water-bearing sand.

In the artificially developed pebbled wall, the pebbles may be delivered from the top of the well through refilling tubes 5 or placed in any appropriate manner. In the developed pebbled wall type, the pumping serves to draw the natural sand and pebbles toward the screen with the finer particles of sand passing through the screen and the pebbles gradually collecting on the outer surface of the screen to form an appropriate thickness of pebbles to constitute a pebbled wall.

The essential and characteristic feature of the present invention is a shoe 6 which, in Figure 1, is shown removably connected at 7 to the bottom of the screen 3. This shoe includes a plate 8 to rest upon the bottom of the well and spaced uprights 9 supporting a ring 10 threaded for connection with the bottom of the screen.

A plug 11 is seated in the ring, serving in effect to substantially close the bottom of the screen and yet provide an opening below the plug proper which is in open communication with the pebbled wall area. The plug 11 is of cementitious material, and is made up of cement and pebbles so that the plug is sufficiently porous to permit the passage of water therethrough from below into the screen. The area 12 within the shoe below the plug 11 is, of course, open to the pebbled area of the wall and during the formation of this wall, either artificially or in development, the pebbles will find their way down and accumulate in the space 12 and serve here as a filtering and screening medium as well as in the area immediately surrounding the screen 3.

In this particular type of well, the shoe is secured to the screen and the plug 11 applied to the shoe before the screen is introduced into the well.

As long as the well is delivering its normal quantity of water, the parts described may remain in the positions indicated, but when notice is given of a failure of water supply, the choking of the openings in the screen and the closing of some of the interstices of the pebbled wall are indicated as the cause of the failure of the water supply. Under these conditions, a bailer or other appropriate tool is inserted in the inner well casing 2 downwardly into contact with the plug 11 and raised and dropped until the plug proper is broken away. A conventional bailing operation is then proceeded with, removing not only the parts of the plug proper but a material part of the pebbled wall, particularly that part which may be accumulated within the shoe below the plug proper. The bailing operation is continued until a material part of the pebbles of the wall are removed. The amount removed will depend upon the condition of the well and the result secured and as each individual effort will be dependent upon the condition of the well, it is sufficient to say that a necessary portion of the pebbles of the pebbled wall will be removed.

As the pebbled wall is made up of relatively loose pebbles, it is at once apparent that when the pebbles of the lower portion of this wall are physically removed, the pebbles making up the wall above the removed portion will tend to move downwardly by gravity to fill the space. In this downward movement of the pebbles, the layer of pebbles next the screen will effectively scrape and scour the exterior surface of the screen, breaking up and removing practically all the accumulations and incrustations on the outer surface of the screen. This will, of course, clear to a very considerable if not complete extent the openings in the screen and restore the screen practically to its original capacity for permitting water flow.

As the pebbles of the pebbled wall are loose, they will, in the downward movement referred to, have a relative action, that is, separate, move toward and from each other, following an irregular path during such downward movement. This will tend to a separation of the pebbles making up the wall and further tend to dislodge any hardened sand or other material previously accumulated in the interstices between the pebbles, and this dislodged material will fall downward, at least to a very material extent and be drawn into the bottom of the well, being of course removed by the bailer or pump, when necessary. The pebbles of the wall in their downward movement will rearrange themselves, forming new interstices and effectively, at least in a general sense, clear and clean their own surfaces and so more or less completely revitalize the pebbled wall into substantially its original condition so far as its filtering efficiency is concerned. If insufficient pebbles remain in the wall following this operation to complete the necessary height of the wall relative to the screen, additional pebbles may be added through the refilling tubes 5 or directly between the inner and outer casings, or additional pebbles developed by the method originally used in the construction of the well.

Following the breaking up of the plug 11, and the conclusion of the bailing operation and the consequent downward movement of the pebbles of the wall, an auxiliary plug 13, shown in Figure 2, is inserted in the well and fitted into the ring 10 to close the lower end of the screen substantially as did the original plug 11. The auxiliary plug 13 is made up of the same material and has the same characteristics as the original plug 11 and may be provided with an element 14 of appropriate form whereby it may be conveniently handled during its insertion. If, after the original cleaning of the screen as described and the application of the auxiliary plug 13, the screen again becomes clogged for the reasons noted, the auxiliary plug may be broken away exactly as was the original plug, the pebbled wall again moved to clear away obstructions, and a second auxiliary plug applied to complete the well formation.

In some installations or wells of this type, the outer casing 1 is moved into the well bore only to that depth at which it will be finally positioned. The screen and inner well casing are then placed within the outer well casing and bailed down to a proper depth to position the screen opposite the water-bearing sand. In this type of well construction, the screen, indicated in Figure 3 at 15, is, incident to the bailing operation, moved below the lower end of the outer well casing 1 until the screen is arranged opposite the water-bearing sand.

In providing in this type of well formation for the use of the improvement, the lower end of the screen is provided with a shoe 16 which has an annular upper end 17 riveted or otherwise securely fixed at 18 to the inner surface of the screen 15, at the lower end of the latter. Below the screen, the shoe 16 has an outwardly flaring or conical wall 19 connected at the lower end to a ring 20 fully open at the bottom and having a cutting edge or margin 21. The wall 16 above the ring is formed with openings 22 in order to permit the flow of water and pebbles from the pebbled wall into the shoe 16. The maximum diameter of the shoe is that of the well bore, so that as the screen and attached shoe are bailed down below the outer well casing, the ring 20 acts to guide and centralize the screen with respect to the outer casing.

The ring 20 rests upon the bottom of the well and is fully open to the admission of water from the water-bearing sand, and to the admission of pebbles to accumulate within the body of the shoe from the pebbled wall which, of course, is provided through the outer well casing and between it and the inner casing as the screen and shoe travel downward to their final positions. The conical formation of the shoe will obviously necessitate a well bailing movement which will remove material at least to a diameter equal to that of the ring 20. This ring 20 is, at its maximum diameter, sufficiently greater than the similar diameter of the screen as to provide an annular space around the screen when the well is completed for the reception of the pebbles.

As in this type of well construction the shoe, screen and inner well casing are bailed to their final position below the outer well casing, it is necessary that the shoe 16 form an open continuation of the screen in order to permit the passage and operation of the bailing tool. Therefore, the more or less permanent plug 11 in the type of well construction described in connection with Figure 1, cannot be used in the type of well construction now being described and illustrated in the necessary particulars in Figure 3. Therefore, until the screen and shoe are in proper positions at the bottom of the well, the shoe is without any plug proper. After the parts are in the final positions, an auxiliary plug similar to the plug 13 of Figure 2, is introduced through the inner well casing and screen and finally seated firmly on an annular ring-like projection 23 secured on the inner surface of the shoe substantially in line with the lower edge of the screen. This plug forms, therefore an effective closure for the bottom of the screen, permitting only the passage of water under the suction of the pump through the plug after being screened or filtered by the pebble accumulation within the shoe below the plug.

In this form, the operation, when it is desired to clean the exterior surface of the screen and revitalize the pebbled wall, is identical with that previously described. Appropriate tools are used to break up the auxiliary plug within the screen 15 and a bailing operation carried out to clean out the space within the shoe below the auxiliary plug, permitting the gravital movement of the pebbles of the pebbled wall for exactly the same purpose and with the same effect as that previously described.

Of course, the shoe 16 may be of various designs so long as it has sufficient diameter to insure the formation of a pebble-receiving area as the shoe and screen move downwardly and so long as the wall of the shoe or the annular portion thereof is freely open for the admission of water and pebbles of the pebbled wall.

What is claimed to be new is:

1. A method of cleaning the exterior of a screen of a pebbled water well of incrustations and accumulations, consisting in compelling a bodily gravital and relative movement of the pebbles lying adjacent to the exterior surface of the screen over such surface.

2. A method of cleaning the exterior of a screen of a pebbled water well, consisting in undermining the pebbles of the wall in contact with the screen to cause the same to move under the influence of gravity relative to the exterior surface of the screen, whereby to cause the pebbles to provide a more or less abrading action on the exterior surface of the screen.

3. A method of clearing the interstices between the pebbles of a water well, consisting in undermining the foundation of the pebbled wall to permit the pebbles to fall by gravity and at the same time move relatively to dislodge and break up any accumulations in the interstices of the original pebbles.

4. A method of scouring the exterior surface of the screen of a pebbled water well and simultaneously breaking up the accumulations in the interstices of said wall, consisting in undermining the pebbles adjacent to the screen to cause the same to move frictionally over the exterior surface of the screen and at the same time move the pebbles making up the wall relatively for breaking up and dislodging the accumulations in the interstices of the pebbles.

5. A pebbled water well having a frangible plug underlying the screen and spaced from the bottom of the well, said plug serving to prevent entry of water through the bottom of the screen, and means for breaking the plug to permit access to the bottom of the well below the screen and thus permit the bailing out of material below the plug to cause the pebbles to move downwardly relative to the screen.

6. A method of cleaning the exterior of the screen of a completed pebbled water well, consisting in removing material from the bottom of the well below the screen to thereby provide an excavation toward which the pebbled wall will gravitate and thereby cause the pebbles of such wall in contact with the screen to exert an abrading action on the surface of the screen for cleaning the same.

CHESTER E. RECORDS.